United States Patent [19]
Goldman

[11] 3,862,933
[45] Jan. 28, 1975

[54] PROCESS FOR MAKING ESTERS OF 6-(ALPHA-(CARBOXY)ARYLA-CETAMIDO)PENICILLANIC ACIDS

[75] Inventor: Irving M. Goldman, Niantic, Conn.

[73] Assignee: Pfizer Inc., New York, N.Y.

[22] Filed: July 12, 1972

[21] Appl. No.: 271,160

[52] U.S. Cl. .............................. 260/239.1, 424/271
[51] Int. Cl. ............................................ C07d 99/16
[58] Field of Search ................................. 260/239.1

[56] References Cited
UNITED STATES PATENTS

| 3,282,926 | 11/1966 | Brain et al. | 260/239.1 |
| 3,453,263 | 7/1969 | Dvonoh et al. | 260/239.1 |
| 3,595,855 | 7/1971 | Robinson | 260/239.1 |
| 3,654,266 | 4/1972 | Robinson | 260/239.1 |

Primary Examiner—Nicholas S. Rizzo
Attorney, Agent, or Firm—Connolly and Hutz

[57] ABSTRACT

An improved process for making α-(carboxy)arylacetyl derivatives of 6-aminopenicillanic acid esters useful as antibacterial agents and as intermediates for 6-[α-(carboxy)arylacetamido]penicillanic acids which comprises acylation of a 6-aminopenicillanic acid ester with a monacid halide of an arylmalonic acid silyl ester in anhydrous reaction-inert solvent.

7 Claims, No Drawings

PROCESS FOR MAKING ESTERS OF 6-(ALPHA-(CARBOXY)ARYLACETAMIDO)PENICILLANIC ACIDS

BACKGROUND OF THE INVENTION

This invention relates to an improvement in the process for making esters of 6-[α-(carboxy)arylacetamido]penicillanic acids and, more particularly, to their preparation by direct acylation of a 6-aminopenicillanic acid ester with a monoacid halide of an arylmalonic acid silyl ester in an anhydrous reaction-inert solvent.

The preparation of esters of 6-[α-(carboxy)arylacetamido]penicillanic acids wherein the ester group is located on the carboxy group of the penicillanic acid moiety has been accomplished in one of two ways. Belgien Pat. No. 759,498, published May 26, 1971, describes preparation of acyloxyalkyl esters by (1) direct acylation of the appropriate 6-aminopenicillanic acid ester with an acid halide or mixed acid anhydride of an arylmalonic acid; and (2) reaction of a 6-[α-(carboxy)arylacetamido]penicillanic acid alkali metal or amine salt with an equimolar amount of a halomethyl ester. British Pat. No. 1,138,745, published Jan. 1, 1969, discloses preparation of the bis(acetoxymethyl)ester of 6-[α-(carboxy)-phenylacetamido]penicillanic acid by reaction of 6-[α-(carboxy)phenylacetamido]penicillanic acid with bromomethylacetate.

These methods, however, generally require the use of an aqueous solvent system to achieve sufficient solubility of the reactants in order to obtain satisfactory yields. In some instances, the use of suspensions of the reactants in N,N-dimethylformamide or methylene chloride has been used. Further, the preparation of monoacyloxyalkyl esters of 6-[α-(carboxy)arylacetamido]penicillanic acids by method (2) above is productive of a mixture of products comprising the bis(acyloxyalkyl) ester and both monoacyloxy alkyl esters. Purification of the mixture is difficult.

The acylation of 6-aminopenicillanic acid in anhydrous media is reported by Glombitza, Ann. 673, 167-170 (1964). The multi-step process, however, does not involve the direct acylation of 6-aminopenicillanic acid in water-free medium to the desired pencillin product. It comprises, as the first step, the silylation of 6-aminopenicillanic acid to 6-aminopenicillanic acid trimethylsilyl ester and N-trimethylsilyl 6-aminopenicillanic acid trimethylsilyl ester, both of which are soluble in non-polar solvents. The silyl derivatives are then acylated with the appropriate acid chloride or mixed acid anhydride to produce acylated silyl derivatives from which the silyl groups are removed by treatment with an hydroxylic-containing solvent to produce the desired penicillin.

The preparation of 6-[α-(carboxy)arylacetamido]-penicillanic acids by the acylation of 6-aminopenicillanic acid trimethylsilyl ester or of N-trimethylsilyl 6-aminopenicillanic acid trimethylsilyl ester with a diacid halide of an arylmalonic acid is described in British Patent Specification 964,449, published Mar. 21, 1962.

A variety of esters of 6-aminopenicillanic acid and N-silyl 6-amino-penicillanic acid silyl esters and their acylation with organic acids or derivatives thereof, such as acid chlorides and anhydrides, is described in U.S. Pat. No. 3,249,622, issued May 3, 1966.

Phenacyl and substituted phenacyl esters of 6-aminopenicillanic acid, their conversion to penicillin esters and, by removal of the phenacyl group, to penicillins are described in U.S. Pat. No. 3,399,207, issued Aug. 27, 1968. Acyloxyalkyl esters of 6-aminopenicillanic acid are reported by Daehne et al., J. Med. Chem. 13, 607–612 (1970) and in U.S. Pat. No. 3,660,575, issued May 2, 1972. The cyanomethyl and benzyl esters are described in U.S. Pat. No. 3,528,965, issued Sept. 15, 1970; and bromoethyl and iodoethyl esters in Netherlands Specification 7010475, published Jan. 19, 1971. Substituted benzyl esters are reported in French Pat. No. 1,576,027, published July 25, 1969. The benzhydryl ester is described in Japanese Specification 26,501, published July 31, 1971, and the 2,2,2-trichlorethyl ester in German Pat. No. 1,287,578, published Jan. 23, 1969.

U.S. Pat. No. 3,642,810, issued Feb. 15, 1972, discloses the preparation of penicillins, including α-carboxybenzylpenicillin, by a process which embraces the acylation of a nitro- or halogen-substituted benzyl or monocarbocyclic arylsulfonylethyl ester of 6-aminopenicillanic acid with an acid chloride or its functional equivalent. The ester group is subsequently removed to provide the penicillin acid.

SUMMARY OF THE INVENTION

It has now been found that satisfactory yields of high purity 6-[α-(carboxy)arylacetamido]penicillanic acids and esters thereof of formula I

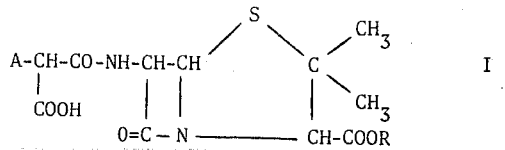

are conveniently prepared by an improved process which comprises acylating an ester of 6-aminopenicillanic acid of formula II

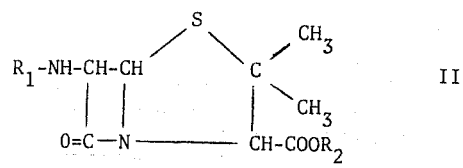

in an anhydrous reaction-inert solvent with a monoacid halide of an arylmalonic acid silyl ester of formula III

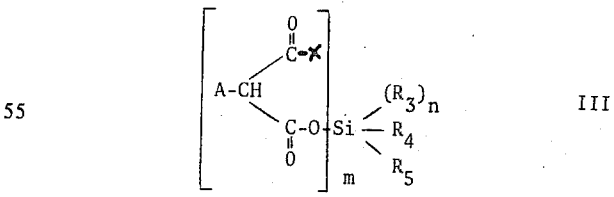

wherein A is selected from the group consisting of 3-thienyl, phenyl and substituted phenyl wherein the substituent is selected from the group consisting of alkyl of from 1 to 4 carbon atoms, chloro, bromo, fluoro, trifluoromethyl and alkoxy of from 1 to 4 carbon atoms;

X is selected from the group consisting of chloro and bromo;

R is a carboxy-protecting group or the desired R group of the final product of formula I and is selected from a first group consisting of hydrogen; a second group consisting of cyanomethyl, benzhydryl, 2,2,2-trichloroethyl, 2-bromoethyl, 2-iodoethyl, benzyl phenacyl, substituted benzyl and substituted phenacyl wherein the substituent is selected from the group consisting of halogen, alkyl of from 1 to 4 carbon atoms, alkoxy of from 1 to 4 carbon atoms, and nitro; and a third group consisting of acyloxy alkyl having from 1 to 4 carbon atoms in the alkyl moiety and wherein acyloxy is selected from the group consisting of alkanoyloxy of from 1 to 6 carbon atoms, benzoyloxy and substituted benzoyloxy wherein the substituent is selected from the group consisting of chloro, bromo, fluoro, alkyl of from 1 to 4 carbon atoms, alkoxy of from 1 to 4 carbon atoms, and trifluoromethyl; and each of $R_3$, $R_4$ and $R_5$ is selected from the group consisting of hydrogen, alkyl of from 1 to 4 carbon atoms, phenyl, benzyl, tolyl and dimethylaminophenyl;

$m$ is an integer from 1 to 2;

$n$ is 0 or 1; with the proviso that when $m$ is 2, $n$ is 0;

$R_1$ is selected from the group consisting of hydrogen and $-SiR_3R_4R_5$; and $R_2$ is selected from the group consisting of R and $-SiR_3R_4R_5$; and treating the acylated product with a hydroxylic-containing solvent, i.e., an alcohol or water, to remove the silyl groups.

DETAILED DESCRIPTION OF THE INVENTION

The acylation reaction is conducted in an anhydrous reaction-inert solvent over the temperature range of about -10° C. to about 20° C., and advantageously at about 0° C. to 10° C. By anhydrous reaction-inert solvents is meant anhydrous, non-hydroxylic solvents which do not react with the reactants or products of the reaction. Representative of such solvents are aliphatic ethers such as diethyl ether, diisopropyl ether, di-n-propyl ether, methyl n-butyl ether, ethyl n-butyl ether, di-n-butyl ether, ethylene glycol dimethyl ether; aromatic ethers such as anisole, N-propyl phenyl ether, p-t-butylanisole, methyl benzyl ether; and alicyclic ethers such as tetrahydrofuran, dioxane; chlorinated hydrocarbons such as methylene chloride, chloroform, carbon tetrachloride, ethylene chloride; hydrocarbons such as benzene, toluene, petroleum ether; and mixtures of such solvents.

In brief, the only requirements for the solvent are that it be anhydrous, reaction-inert, and a liquid at the temperature of the reaction. The preferred solvents are the aliphatic ethers, especially diisopropyl ether, and tetrahydrofuran because of their ease of handling and ease of recovery in large-scale operations.

The monoacid halide of the arylmalonic acid silyl ester and the 6-aminopenicillanic acid ester are reacted together in at least a 1:1 molar ratio. Alternatively, an acid addition salt of the 6-aminopenicillanic acid ester, e.g., the hydrochloride, can be used together with sufficient base such as a tertiary amine to neutralize the acid introduced by the salt. In actual practice, however, it is advantageous to use an excess of the monoacid halide of the arylmalonic acid silyl ester to insure more complete acylation of the 6-aminopenicillanic acid ester. Molar ratios of reactants from about 1:1 to about 1:1.2, respectively, have been found productive of satisfactory yields of good quality product. As one skilled in the art will recognize, the 6-amino-penicillanic acid ester can be used in excess without detriment to the reaction. This option will often be adopted when the monoacid halide of the arylmalonic acid silyl ester is the more costly or least readily available of the reactants.

The acylation reaction is conducted in the presence of an acidbinding agent which is soluble in the reaction-inert solvent. Suitable acidbinding agents are the tertiary amines such as triethylamine, pyridine, lutidine, dimethylaniline and quinoline. Alternatively, suspensions of an alkali metal carbonate (sodium, potassium, magnesium or calcium) can be used as acid-binding agent. Stoichiometric amounts of such agents are used based upon the amount of by-product acid produced and the amount of acid present in the reactants, e.g., an acid addition salt of the 6-aminopenicillanic acid ester.

It is, of course, essential that moisture be excluded from the reaction to avoid hydrolysis of the silyl groups prior to completion of the acylation step. The silylated product can be recovered, if desired, by evaporation of the reaction-inert solvent. In most, if not all, instances, however, the protective silyl group of the α-carboxy group is removed after it has served its function of permitting the acylation reaction to be conducted in an anhydrous medium and of protecting the α-carboxy group against decarboxylation. Removal of the silyl groups from the acylated products is readily accomplished by treating the silylated derivative with a hydroxylic-containing solvent such as water or an alcohol, e.g., methanol, ethanol, n-propanol, isopropanol, n-butanol, hexanol.

The monoacid halides of the arylmalonic acid silyl esters are readily prepared by reacting the appropriate arylmalonic acid monoacid halide with a silylating agent selected from the group consisting of

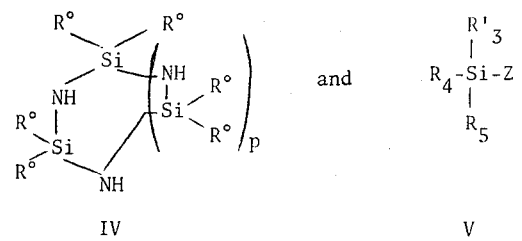

IV                                      V wherein $R'_3$ is selected from the group consisting of halogen and $R_4$; and each of $R_4$ and $R_5$ is selected from the group consisting of hydrogen, alkyl of from 1 to 4 carbon atoms, phenyl, benzyl, tolyl and dimethylaminophenyl, at least one of the said R's being other than halogen and hydrogen; $R°$ is alkyl to 1 to 7 carbon atoms; $p$ is an integer from 1 to 2; and Z is selected from the group consisting of halogen and

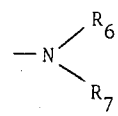

and $R_6$ is selected from the group consisting of hydrogen and alkyl of 1 to 7 carbon atoms; and $R_7$ is selected from the group consisting of hydrogen, alkyl of 1 to 7 carbon atoms and

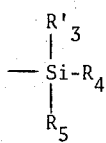

The reaction is conducted in an anhydrous reaction-inert, that is, an anhydrous, nonhydroxylic solvent of the type mentioned above, and preferably in isopropyl ether, at a temperature of from about -10° C. to about -80° C., and preferably at from -20° C. to -60° C. The reaction is often conducted in the presence of an acid-binding agent, that is, a base such as an alkali metal carbonate or tertiary amine, e.g., triethylamine, diethylaniline, pyridine, quinoline and lutidine. The base may be a part of the silylating agent as is the case when the silylating agent is of formula V wherein Z is $-NR_6R_7$, or of formula IV, and said agent is used in combination with a compound of formula V wherein Z is halogen.

Representative of suitable silyl compounds are trimethylchlorosilane, hexamethyldisilazane, triethylchlorosilane, methyltrichlorosilane, dimethyldichlorosilane, triethylbromosilane, tri-n-propylchlorosilane, bromomethyldimethylchlorosilane, tri-n-butylchlorosilane, methyldiethylchlorosilane, dimethylethylchlorosilane, phenyldimethylbromosilane, benzylmethylethylchlorosilane, phenylethylmethylchlorosilane, triphenylchlorosilane, triphenylfluorosilane, tri-o-tolylchlorosilane, tri-p-dimethylaminophenylchlorosilane, N-ethyltriethylsilylamine, hexaethyldisilazane, triphenylsilylamine, tri-n-propylsilylamine, tetraethyldimethyldisilazane, tetramethyldiethyldisilazane, tetramethyldiphenyldisilazane, hexaphenyldisilazane, hexa-p-tolyldisilazane, etc., and mixtures of these. The same effect is produced by hexa-alkycyclotrisilazanes or octaalkylcyclotetrasilazanes. Other suitable silylating agents are silylamides and silylureides, such as a trialkylsilylacetamide and a bis-trialkylsilylacetamide.

The preferred silylating agents are trimethylsilyl chloride and mixtures of trimethylsilyl chloride and hexamethyldislazane, and especially mixtures of these because of their overall reactivity, availability, ease of handling, satisfactory yields produced and, as regards the mixtures, the generation of ammonia by the disilazane which serves as acid-binder. The procedures illustrated herein are those described by Pierce in "Silylation of Organic Compounds," Pierce Chemical Company, Rockford, Ill.

The arylmalonic acid monoacid halides (chloride, bromide) are prepared by methods known to those skilled in the art. These comprise the reaction of an appropriate arylmalonic acid with an equimolar or slight excess of a halogenating agent, such as thionyl halides, phosphorous oxyhalides, phosphorous pentahalides or oxalyl halides. The preferred halogenating agents are the thionyl halides since the by-products are volatile and cause no problems in subsequent steps of this process. An aliphatic, aromatic or alicyclic ether is generally used as solvent since it permits the subsequent silylation of the monoacid halide to be conducted in the same reaction vessel.

The products of this invention are useful antibacterial agents both in vitro and in vivo against gram-positive and gram-negative bacteria. Additionally, the compounds of formula I, especially those wherein R is other than acyloxyalkyl, are useful intermediates for the production of 6-[α-(carboxy)-arylacetamido]penicillanic acids. The phenacyl and substituted phenacyl ester groups are removed by treatment with certain basic or nucleophilic agents, such as sodium or potassium thiophenoxide, as disclosed in U.S. Pat. Nos. 3,399,207 and 3,642,810. When R is benzyl or substituted benzyl, conversion to the acid is also accomplished by catalytic hydrogenation according to the procedure of British Pat. 1,004,670. When R is 2,2,2-trichloroethyl the acid is generated by treatment with chemical reducing agents such as nascent hydrogen, alkali or alkaline earth metals in liquid ammonia. Removal of the 2-bromoethyl groups is accomplished by treatment with iodide, e.g., sodium iodide, to give the 2-iodoethyl ester which is then treated with a reducing agent such as a metal, metal alloy or amalgam, and especially elemental zinc, and a nascent hydrogen-forming medium, especially acetic acid, as described in Netherlands Specification 7010475.

EXAMPLE I

Pivaloyloxymethyl 6-α[α-(Carboxy)Phenylacetamido Penicillanate

A slurry of pivaloyloxymethyl 6-aminopenicillanate hydrochloride (1.83 g., 0.005 M) in water (50 ml.) was overlaid with diisopropyl ether (50 ml.) and the pH adjusted to 7.0 by addition of a saturated solution of sodium hydroxide. The mixture was stirred and the layers then separated. The aqueous layer was washed with fresh diisopropyl ether (2 × 25 ml.) and the combined diisopropyl ether extracts dried over magnesium sulfate. The dried extract was cooled to 0° C., N,N-dimethylaniline (0.605 g.) added, with stirring and cooling, followed by phenylmalonyl chloride trimethylsilyl ester (0.006 M, 30 ml. of solution of Preparation A) over a 5 minute period. The reaction mixture was then washed with water (2 × 25 ml.), layered with water (50 ml.) and the pH adjusted to 7.0 with saturated sodium bicarbonate solution. The mixture was stirred, the layer separated and the aqueous phase washed with diisopropyl ether (25 ml.). The aqueous phase was layered with ethyl acetate (25 ml.) and adjusted to pH 3.5 with 2N hydrochloric acid. The mixture was stirred gently and the aqueous phase then separated and washed with ethyl acetate (2 × 25 ml.). The combined ethyl acetate solutions were dried (MgSO$_4$) and evaporated under reduced pressure to give the product as a colorless gum (1.70 g., 69.2% yield).

It was converted to the sodium salt by dissolving in ethyl acetate (5 ml.), diluting to 200 ml. with diisopropyl ether and adding sodium 2-ethylhexanoate (2.5 ml. of ethyl acetate solution containing 238 mg. of sodium salt/ml.). The amorphous product which separated was recovered by centrifugation, washed with diisopropyl ether and dried.

EXAMPLE II

The procedure of Example I is repeated but using the appropriate arylmalonyl chloride trimethylsilyl ester and the appropriate acylorryalkyl ester of 6- aminopenicillanic acid to produce the following compounds:

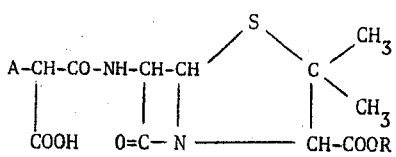

| A | R | A | R |
|---|---|---|---|
| C₆H₅ | CH₂OCOCH₃ | 3—CH₃C₆H₄ | CH₂OCOCH(CH₃)₂ |
| C₆H₅ | CH(CH₃)OCOCH₃ | 3—CH₃C₆H₄ | CH(CH₃)OCOC₆H₅ |
| C₆H₅ | CH₂OCOCH(CH₃)₂ | 3—C₂H₅OC₆H₄ | CH₂OCOC(CH₃)₃ |
| C₆H₅ | CH₂OCOCH(C₂H₅)₂ | 2—CH₃OC₆H₄ | CH(CH₃)OCOCH₃ |
| C₆H₅ | CH(C₂H₅)OCOCH₃ | 2—CH₃OC₆H₄ | CH₂OCO—(4—CF₃C₆H₄) |
| C₆H₅ | CH₂OCOC₆H₅ | 2—CH₃OC₆H₄ | CH₂OCO—(3—BrC₆H₄) |
| C₆H₅ | CH₂OCO—(4—ClC₆H₄) | 3—CH₃OC₆H₄ | CH₂OCOCH(C₂H₅)₂ |
| 4—ClC₆H₄ | CH₂OCOC(CH₃)₃ | 4—CH₃OC₆H₄ | CH₂OCOC(CH₃)₃ |
| 4—ClC₆H₄ | CH(C₂H₅)OCOC₆H₅ | 2—CF₃C₆H₄ | CH(C₂H₅)OCOCH₃ |
| 4—ClC₆H₄ | CH₂OCO—(n—C₃H₇) | 2—CF₃C₆H₄ | CH₂OCOC₆H₅ |
| 4—ClC₆H₄ | CH₂OCO—(2—ClC₆H₄) | 3—CF₃C₆H₄ | |
| | | CH₂OCOCH₃ | |
| 2—ClC₆H₄ | CH(CH₃)OCOC₆H₅ | 4—CF₃C₆H₄ | CH₂OCO—(n—C₃H₇) |
| 2—ClC₆H₄ | CH₂OCOCH₃ | 2—i—C₃H₇C₆H₄ | CH₂OCOC(CH₃)₃ |
| 2—ClC₆H₄ | CH(n—C₃H₇)OCOCH₃ | 2—i—C₃H₇C₆H₄ | CH(CH₃)OCOCH₃ |
| 4—BrC₆H₄ | CH₂OCOCH(CH₃)₂ | 4—n—C₄H₉OC₆H₄ | CH(CH₃)OCOCH₃ |
| 4—BrC₆H₄ | CH₂OCO—(4—CF₃C₆H₄) | 3—BrC₆H₄ | CH₂OCO—(2—CH₃C₆H₄) |
| 4—FC₆H₄ | CH(n—C₃H₇)OCOCH₃ | 3—ClC₆H₄ | CH₂OCO—(4—CH₃C₆H₄) |
| 2—CH₃C₆H₄ | CH₂OCO—(n—C₅H₁₁) | 2—n—C₄H₉C₆H₄ | CH₂OCOCH(C₂H₅)₂ |
| 2—n—C₄H₉OC₆H₄ | CH₂OCO—n—C₄H₉ | 2—n—C₄H₉OC₆H₄ | CH₂OCO—(2-CH₃OC₆H₄) |
| 3—CF₃C₆H₄ | CH₂OCO—(4—n—C₄H₉C₆H₄) | 3—thienyl | CH₂OCOCH₃ |
| 3—thienyl | CH₂OCOC(CH₃)₃ | 3—thienyl | CH(CH₃)OCOCH₃ |
| 3—thienyl | CH₂OCO—n—C₄H₉ | 3—thienyl | CH₂OCOC₆H₅ |
| 3—thienyl | CH₂OCO—(4—CH₃C₆H₄) | 3—thienyl | CH₂OCO—(2—ClC₆H₄) |

EXAMPLE III

6- α-(Carboxy)phenylacetamido]Penicillanic acid

A mixture of 6-aminopenicillanic acid trimethylsilyl ester and N-trimethylsilyl 6-aminopenicillanic acid trimethylsilyl ester (prepared according to Example 6 of U.S. Pat. No. 3,249,622) is dissolved in sufficient tetrahydrofuran to give a total volume of 100 ml.

To ten ml. of the above solution, equivalent to 2.16 g. of 6-aminopenicillanic acid, is added triethylamine (1.21 g.), followed by dropwise addition of a solution of phenylmalonyl chloride trimethylsilyl ester (4.75 g.) in tetrahydrofuran (10 ml.) at a temperature of 0°-5°C. over a 5 minute period. The reaction mixture is worked up according to the procedure of Example I to give the title product. EXAMPLE IV The procedure of Example I is repeated but using, in place of pivaloyloxymethyl 6-aminopenicillanate, the esters of 6-aminopenicillanic acid listed below:
triphenylmethyl
phenacyl
4-bromophenacyl
4-methoxyphenacyl
4-nitrophenacyl
4-methylphenacyl
4-chlorophenacyl
3-chlorophenacyl
4-ethylphenacyl
4-ethoxyphenacyl
2-nitrophenacyl
3,4-dimethylphenacyl
2,4,6-trimethylphenacyl
6-methoxy-3-methylphenacyl
2-methylbenzyl
4-n-butylbenzyl
bis(p-methoxyphenyl)methyl
benzyl
4-nitrobenzyl
3-chlorobenzyl
4-chlorobenzyl
2,6-dichlorobenzyl
3,4-dibromobenzyl
2,4,5-trichlorobenzyl
benzhydryl
2,2,2-trichloroethyl
2-iodoethyl
2-bromoethyl
cyanomethyl
2-methoxybenzyl
4-n-propoxybenzyl
4-n-butylphenacyl In each instance, the corresponding ester of 6-[(α-carboxy)phenylacetamido]penicillanic acid is produced.

EXAMPLE V

Pivaloyloxymethyl 6-[α-(Carboxy)phenylacetanido]Penicillanate

The procedure of Example I is repeated but using bis(phenylamalonyl chloride)dimethylisilyl ester (0.003M) in place of phenylmalonyl chloride trimethylsilyl ester to give the title product.

EXAMPLE VI

6-[α-(Carboxy)Phenylacetamido]Penicillanic Acid

Phenacyl 6-[α-(carboxy)phenylacetamido]penicillanate 2.45 g., 5 mM) in N,N-dimethylformamide (15 ml.) is treated with sodium thiophenoxide (0.72 g., 5.5 mM) in N,N-dimethylformamide (5.0 ml.) at room temperature. After stirring for one-half hour, the mixture is poured into acetone/ether (100 ml. of 1:1) and the product recovered by filtration.

In like manner, the remaining phenacyl, substituted phenacyl and benzhydryl ester derivatives of Example IV are converted to the corresponding salt.

EXAMPLE VII

6-[α-(Carboxy)Phenylacetamido]Penicillanic Acid

Benzyl 6-[α-(carboxy)phenylacetamido]penicillanate, as its sodium salt (0.33 g., 1.0 mM), in water (10 ml.) is added to a pre-hydrogenated suspension of 5% palladium on calcium carbonate (1.0 g.) in water (15 ml.) and hydrogenated at room temperature until absorption of hydrogen ceases. The mixture is filtered, the filtrate layered with ethyl acetate (25 ml.) and adjusted to pH 2.5 with dilute hydrochloric acid. The layers are separated; the aqueous phase extracted with ethyl acetate (3 × 10 ml.), and the combined extracts washed with water and dried. Evaporation of the ethyl acetate affords the product.

Similarly, the remaining benzyl and the cyanomethyl esters of Example IV are converted to the free acid.

The 2,2,2-trichloroethyl group is removed by treatment with zinc dust and 90% aqueous acetic acid at 0° C. according to the procedure of Woodward et al., J. Am. Chem. Soc. 88, 852 (1966).

PREPARATION A

Phenylmalonyl Chloride Trimethylsilyl Ester

A mixture of phenylmalonic acid (18 g., 0.10M), thionyl chloride (13.1 g., 0.11M) and three drops of N,N-dimethylformamide in diisopropyl ether (250 ml.) was mixed and refluxed on a steam bath for 45 minutes. The mixture was then cooled and reduced to half-volume under reduced pressure to remove unreacted thionyl chloride, sulfur dioxide and hydrogen chloride. The concentrate was diluted to 250 ml. with diisopropyl ether. Trimethylchlorosilane (10.8 g., 0.10M) was added, the mixture cooled to −78° C. in a dry ice-acetone bath and hexamethyl disilazane (7 ml., 0.033mM) in diisopropyl ether (10 ml.) added. The mixture was allowed to warm to room temperature and then diluted to 500 ml. with diisopropyl ether. Fifty ml. of this solution contains 0.01M of product.

Repetition of this procedure but substituting the appropriate arylmalonic acid for phenylmalonic acid affords the following compounds:

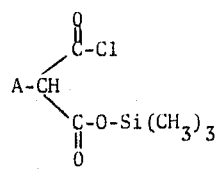

| A |
|---|
| 4—ClC$_6$H$_4$ |
| 2—ClC$_6$H$_4$ |
| 4—BrC$_6$H$_4$ |
| 2—CH$_3$C$_6$H$_4$ |
| 2—n—C$_4$H$_9$OC$_6$H$_4$ |
| 2—CH$_3$OC$_6$H$_4$ |
| 3—C$_2$H$_5$OC$_6$H$_4$ |
| 3—CH$_3$OC$_6$H$_4$ |
| 4—CH$_3$OC$_6$H$_4$ |
| 3—BrC$_6$H$_4$ |

| A |
|---|
| 2—FC$_6$H$_4$ |
| 3—thienyl |
| 3—ClC$_6$H$_4$ |
| 3—CF$_3$C$_6$H$_4$ |
| 3—CH$_3$C$_6$H$_4$ |
| 2—CF$_3$C$_6$H$_4$ |
| 4—CF$_3$C$_6$H$_4$ |
| 2—i—C$_3$H$_7$C$_6$H$_4$ |
| 4—n—C$_4$H$_9$OC$_6$H$_4$ |

PREPARATION B

Trimethylsilyl Ester of 4-Chlorophenylmalonic Acid Chloride

Trimethylchlorosilane (2.16 g., 0.02M) is added to a solution of the monoacid chloride of 4-chlorophenylmalonic acid (3.98 g., 0.02M) in diisopropyl ether (50 ml.) while stirring. The mixture is refluxed for five hours and then cooled. A dry stream of nitrogen is passed through the mixture to expedite removal of hydrogen chloride. The solution is used as such in subsequent acylation reactions. If desired, it is concentrated under reduced pressure.

PREPARATION C

2-Tolylmalonyl Chloride Trimethylsilyl Ester

Trimethylchlorosilane (2.16 g., 0.02M) is added to a solution of 2-tolylmalonic acid monoacid chloride (4.28 g., 0.02M) and pyridine (1.58 g., 0.02M) in diisopropyl ether (75 ml.) while stirring. The mixture is refluxed for five hours and then cooled and filtered. The filtrate is used as such in subsequent acylations.

In like manner, the following esters are prepared from appropriate arylmalonyl chlorides and silyl compounds (ClSiR$_3$R$_4$R$_5$):

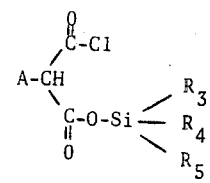

| A | R$_3$ | R$_4$ | R$_5$ | A | R$_3$ | R$_4$ | R$_5$ |
|---|---|---|---|---|---|---|---|
| C$_6$H$_5$ | C$_2$H$_5$ | C$_2$H$_5$ | C$_2$H$_5$ | 4—CH$_3$OC$_6$H$_4$ | C$_2$H$_5$ | C$_2$H$_5$ | C$_2$H$_5$ |
| C$_6$H$_5$ | C$_7$H$_7$ | CH$_3$ | C$_2$H$_5$ | 2—CF$_3$C$_6$H$_4$ | 4—DAP* | 4—DAP | 4—DAP |
| C$_6$H$_5$ | n—C$_4$H$_9$ | n—C$_4$H$_9$ | n—C$_4$H$_9$ | 3—CF$_3$C$_6$H$_4$ | CH$_3$ | C$_6$H$_5$ | C$_2$H$_5$ |
| 3—thienyl | C$_6$H$_5$ | C$_6$H$_5$ | C$_6$H$_5$ | 4—CF$_3$C$_6$H$_4$ | CH$_3$ | C$_2$H$_5$ | C$_2$H$_5$ |
| 2—ClC$_6$H$_4$ | C$_2$H$_5$ | C$_2$H$_5$ | C$_2$H$_5$ | 2—i—C$_3$H$_7$C$_6$H$_4$ | C$_6$H$_5$ | CH$_3$ | CH$_3$ |
| 4—BrC$_6$H$_4$ | CH$_3$ | CH$_3$ | CH$_3$ | 4—n—C$_4$H$_9$OC$_6$H$_4$ | 2—tolyl | 2—tolyl | 2—tolyl |
| 3—BrC$_6$H$_4$ | n—C$_3$H$_7$ | n—C$_3$H$_7$ | n—C$_3$H$_7$ | 3—ClC$_6$H$_4$ | C$_2$H$_5$ | C$_2$H$_5$ | CH$_3$ |
| 4—FC$_6$H$_4$ | CH$_3$ | CH$_3$ | CH$_3$ | C$_6$H$_5$ | CH$_3$ | CH$_3$ | C$_2$H$_5$ |
| 2—CH$_3$C$_6$H$_4$ | C$_6$H$_5$ | C$_2$H$_5$ | CH$_3$ | C$_6$H$_5$ | CH$_3$ | CH$_3$ | C$_6$H$_5$ |
| 2—CH$_3$OC$_6$H$_4$ | CH$_3$ | CH$_3$ | CH$_3$ | 3—thienyl | CH$_3$ | CH$_3$ | C$_2$H$_5$ |
| 3—C$_2$H$_5$OC$_6$H$_4$ | C$_2$H$_5$ | C$_2$H$_5$ | C$_2$H$_5$ | 3—thienyl | C$_7$H$_7$ | CH$_3$ | C$_2$H$_5$ |
| 3—CH$_3$OC$_6$H$_4$ | C$_6$H$_5$ | C$_6$H$_5$ | C$_6$H$_5$ | 4—ClC$_6$H$_4$ | CH$_3$ | CH$_3$ | C$_6$H$_5$ |
| | | | | C$_6$H$_5$ | C$_6$H$_5$ | C$_6$H$_5$ | C$_6$H$_5$ |

*4—DAP = 4—(CH$_3$)$_2$NC$_6$H$_4$

PREPARATION D

Bis(Phenylmalonyl Chloride) Dimethylsilyl Ester

Dimethyldichlorosilane (1.29 g., 0.01 M) is added to a solution of phenylmalonic acid monoacid chloride (3.98 g., 0.02 M) in diisopropyl ether (250 ml.), prepared as in Preparation A, with stirring and passage of a dry stream of nitrogen through the mixture. The mixture is then refluxed for five hours with continued passage of nitrogen through the mixture and then concentrated to half-volume and used as such in subsequent acylations.

PREPARATION E

Phenylmalonyl Chloride Trimethylsilyl Ester a.
Trimethyl chlorosilane (10.8 g., 0.10 M) is added to solution of phenylmalonyl chloride (0.10 M) in diisorpropyl ether (250 ml.), prepared according to Preparation A, and the mixture cooled to -78°C. in a dry iceacetone bath. Hexamethylcyclotrisilazane (1.76 g., 0.011 M) in diisopropyl ether (10 ml.) is added and the mixture allowed to warm to room temperature by removal of the cooling bath. The mixture is diluted to 500 ml. with diisopropyl ether.

B. This product, when used in the procedure of Example I, provides a product identical to that of Example I.

Repetition of the procedure of (a) above, but using the appropriate arylmalonic acid (0.10 M) and the appropriate silylating agents of the formulae $R'_3R_4R_5SiCl$ and $-(NHSiR°R°)-_t$, where $R'_3$, $R_4$, $R_5$ and $R°$ are as defined above and $t$ is 3 or 4, in the proportions listed below, provides the following arylmalonyl chloride silyl esters:

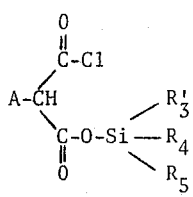

| A | $R_3'$ | $R_4, R_5$ | Mols. | $R°$ | $t$ | Mols. |
|---|---|---|---|---|---|---|
| $C_6H_5$ | $CH_3$ | $CH_3$ | 0.10 | $C_2H_5$ | 3 | 0.011 |
| $C_6H_5$ | $CH_3$ | $CH_3$ | 0.03 | $CH_3$ | 3 | 0.011 |
| $C_6H_5$ | $CH_3$ | $CH_3$ | 0.03 | $CH_3$ | 4 | 0.0085 |
| $4-CH_3C_6H_4$ | o—tolyl | o—tolyl | 0.10 | $CH_3$ | 3 | 0.011 |
| $2-ClC_6H_4$ | 4—DAP* | 4-DAP | 0.10 | $C_2H_5$ | 3 | 0.011 |
| 3—thienyl | $C_6H_5$ | $CH_3$ | 0.03 | $CH_3$ | 4 | 0.0085 |

*4—DAP = 4—$(CH_3)_2NC_6H_4$

PREPARATION F

Acyloxyalkyl Esters of 6-Aminopenicillanic Acid

A mixture of 6-aminopenicillanic acid (21.6 g., 0.10 M), N,N-di-methylformamide (100 ml.) and triethylamine (9.8 ml., 1.4 M) is stirred for 30 minutes at room temperature. The appropriate acyloxyalkyl chloride (0.2 M) is added and the mixture stirred for 4 hours. Ethyl acetate (300 ml.) is added, the precipitated triethylamine hydrochloride filtered off; and the filtrate washed with water (4 × 50 ml.). The filtrate is dried ($Na_2SO_4$) and then concentrated to half-volume unde reduced pressure. A solution of 1N hydrochloric acid in isopropanol is added to precipitate the hydrochloride salt.

In this manner, the following esters are prepared

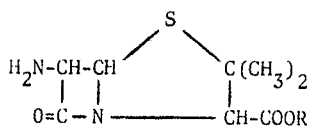

| R | R |
|---|---|
| $CH(CH_3)OCOCH_3$ | $CH(CH_3)OCOC_6H_5$ |
| $CH(C_2H_5)OCOCH_3$ | $CH_2OCO(n-C_5H_{11})$ |
| $CH_2OCO-(4-Cl-C_6H_4)$ | $CH_2OCO-(3-BrC_6H_4)$ |
| $CH(C_2H_5)OCOC_6H_5$ | $CH_2OCO-(2-CH_3C_6H_4)$ |
| $Ch_2OCO-(2-ClC_6H_4)$ | $CH_2OCO-(4-CH_3C_6H_4)$ |
| $CH(n-C_3H_7)OCOCH_3$ | $CH_2OCO-(2-CH_3OC_6H_4)$ |
| $CH_2OCO-(4-CF_3C_6H_4)$ | $CH_2OCO-(4-n-C_4H_9C_6H_4)$ |

The chloroalkyl alkanoates and chloroalkyl benzoates are prepared by the procedures of Ulich et al., J. Am. Chem. Soc. 43, 660 (1921) and of Euranto et al., Acta Chem. Scand. 20, 1273 (1966).

PREPARATION G

Triphenylmethyl 6-Aminopenicillanate

Triphenylmethyl chloride (27.88 g., 0.10 M) and triethylamine (5.06 g., 0.05 M) are added to 6-aminopenicillanic acid triethylamine salt (15.87 g., 0.05 M) in chloroform (250 ml.) and the mixture stirred at room temperature for 24 hours. Water (100 ml.) is added and the mixture acidified with dilute hydrochloric acid (0.01 M) to remove the N-triphenylmethyl group. The aqueous phase is separated, neutralized with aqueous sodium bicarbonate and extracted with ether (3 × 150 ml.). The ether phase is separated, washed with water (150 ml.) and dried ($MgSO_4$). Removal of the ether provides the product.

PREPARATION H

Bis(p-Methoxyphenyl)methyl-Methyl-6-Aminopenicillanate

Benzylpenicillin bis(p-methoxyphenyl)methyl ester (28.03 g., 0.05 M) is added to a mixture of phosphorous pentachloride (11.87 g., 0.057 M) and quinoline (14.21 g., 0.11 M) in dry, ethanol-free chloroform (125 ml.) at −10° C. The mixture is stirred for 15 minutes at −10° C., n-propanol (37.5 ml., 0.5 M) added over a 5 minute period and the mixture held at −10° C. for an additional 15 minutes. A solution of sodium chloride (17.8 g. in 80 ml. water) is added with stirring, followed by petroleum ether (350 ml.) and the mixture stirred for 20 minutes. The aqueous phase is separated and the organic phase is filtered to provide the product. It is slurried in saturated aqueous sodium chloride, filtered, washed with ether and dried.

What is claimed is:

1. In the process for making 6-[α-(carboxy)arylacetamido] penicillanic acids of the formula

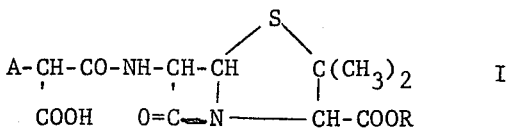

by the acylation, in an anhydrous reaction-inert solvent at a temperature of from −10° to about 20°C., of an ester of 6-amino-penicillanic acid of the formula

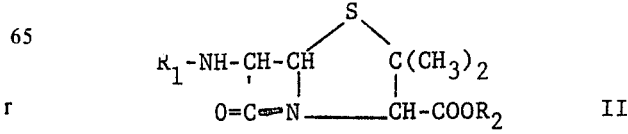

with a monoacid halide of an arylmalonic acid, the improvement which comprises acylating the 6-aminopenicillanic acid ester with a silyl ester of a monoacid halide of an arylmalonic acid of the formula

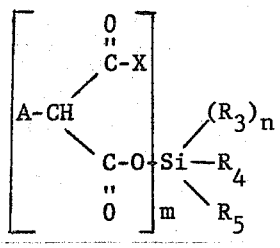   III wherein A is selected from the group consisting of 3-thienyl, phenyl and substituted phenyl wherein the substituent is selected from the group consisting of alkyl of from 1 to 4 carbon atoms, chloro, bromo, fluoro, trifluoromethyl and alkoxy of from 1 to 4 carbon atoms;

X is selected from the group consisting of chloro and bromo;

R is selected from a first group consisting of hydrogen, a second group consisting of cyanomethyl, benzhydryl, 2,2,2-trichloroethyl, 2-iodoethyl, 2-bromoethyl, benzyl, phenacyl, substituted benzyl and substituted phenacyl wherein the substituent is selected from the group consisting of halogen, alkyl of from 1 to 4 carbon carbon atoms, alkoxy of from 1 to 4 carbon atoms and nitro; and a third group consisting of acyloxy alkyl having from 1 to 4 carbon atoms in the alkyl moiety and wherein acyloxy is selected from the group consisting of alkanoyloxy of from 1 to 6 carbon atoms, benzoyloxy and substituted benzoyloxy wherein the substituent is selected from the group consisting of chloro, bromo, fluoro, alkyl of from 1 to 4 carbon atoms, alkoxy of from 1 to 4 carbon atoms and trifluoromethyl;

$m$ is an integer from 1 to 2;

$n$ is 0 or 1, with the proviso that when $m$ is 2, $n$ is 0;

$R_1$ is selected from the group consisting of hydrogen and $-SiR_3R_4R_5$; and $R_2$ is selected from the group consisting of R and $-SiR_3R_4R_5$;

each of $R_3$, $R_4$ and $R_5$ is selected from the group consisting of of hydrogen, alkyl of from 1 to 4 carbon atoms, phenyl, benzyl, tolyl and dimethylaminophenyl;

treating the acylated product thus produced with a hydroxylic-containing solvent;

and recovering the product of formula I.

2. The process of claim 1 wherein the arylmalonic acid halide silyl ester is of the formula

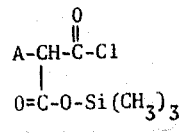

3. The process of claim 2 wherein the 6-aminopenicillanic acid ester is of the formula

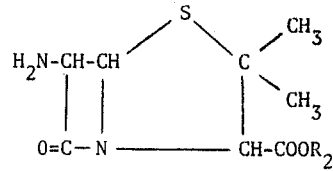

wherein $R_2$ is R and is selected from the second group.

4. The process of claim 2 wherein the 6-aminopenicillanic acid ester is of the formula

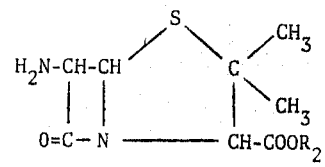

wherein $R_2$ is R and is selected from the third group and is alkanoyloxyalkyl.

5. The process of claim 4 wherein the 6-aminopenicillanic acid ester is pivaloyloxymethyl 6-aminopenicillanate and the arylmalonic acid halide silyl ester is

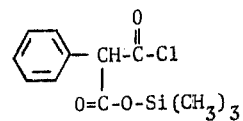

6. The process of claim 3 wherein the ester group of the 6-[(α-carboxy)arylacetamido]penicillanic acid ester of formula I is phenacyl or said substituted phenacyl.

7. The process of claim 3 wherein the ester group of the 6-[(α-carboxy)arylacetamido]penicillanic acid ester of formmula I is 2,2,2-trichloroethyl.

* * * * *